… … … … … … … … … … … … … … … … … … … … … … … … … … … … … … 1427904 3/1976 United Kingdom ............... 534/632

Primary Examiner—Floyd D. Higel
Attorney, Agent, or Firm—Wenderoth, Lind & Ponack

United States Patent [19]
Schütz et al.

[11] Patent Number: 4,990,598
[45] Date of Patent: Feb. 5, 1991

[54] FIBRE-REACTION 1:1 CHROMIUM COMPLEX AZO OR AZOMETHINE DYES HAVING A BIDENTATE CHELATING GROUP AND A MONOFUNCTIONAL NEUTRAL LIGAND

[76] Inventors: Hans U. Schütz, Hans Huber-Strasse 23, 4053 Basle, Switzerland; Ulrich Schlesinger, Hermann Sautter 5, 7851 Binzen; Gerhard Back, Hammerstrasse 5, 7850 Lörrach, both of Fed. Rep. of Germany

[21] Appl. No.: 669,214

[22] Filed: Nov. 7, 1984

[30] Foreign Application Priority Data

Nov. 7, 1983 [CH]  Switzerland ................ 5987/83

[51] Int. Cl.$^5$ ............ C09B 62/08; C09B 62/24; C09B 62/40; C09B 62/50
[52] U.S. Cl. .................... 534/619; 534/622; 534/627; 534/628; 534/602; 534/591; 534/725; 534/712; 534/722; 534/573
[58] Field of Search ............... 534/619, 622, 627, 628

[56] References Cited

U.S. PATENT DOCUMENTS

| | | | |
|---|---|---|---|
| 3,356,671 | 12/1967 | Johnson et al. ............... | 534/712 |
| 3,538,073 | 11/1970 | Mack et al. ............... | 534/619 X |
| 3,878,158 | 4/1975 | Brouard et al. ............... | 260/37 |
| 4,008,211 | 2/1977 | Liehard et al. ............... | 534/710 X |
| 4,012,369 | 3/1977 | Brouard et al. ............... | 260/146 |
| 4,019,857 | 4/1977 | Breda ............... | 8/42 |
| 4,045,423 | 8/1977 | Brouard et al. ............... | 260/147 |
| 4,123,429 | 10/1978 | Brouard et al. ............... | 260/147 |
| 4,218,367 | 8/1980 | Brouard et al. ............... | 260/146 |

FOREIGN PATENT DOCUMENTS

| | | | |
|---|---|---|---|
| 933622 | 9/1955 | Fed. Rep. of Germany ...... | 534/711 |
| 2034315 | 8/1972 | France ............... | 534/622 |
| 793903 | 4/1958 | United Kingdom ............... | 534/711 |
| 949960 | 2/1964 | United Kingdom ............... | 534/622 |
| 1271226 | 4/1972 | United Kingdom ............... | 534/622 |

[57] ABSTRACT

The invention relates to chromium complexes of the formula

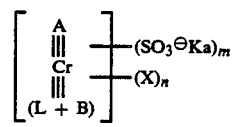

in which A is the radical of a dicyclically metallizable azo or azomethine dye, B is the radical of a monoanionic bidentate complexible organic compound which is bonded to the chromium atom via oxygen atoms, L is a colorless monofunctional ligand, X is halogen-substituted $C_{1-4}$-alkanoyl, $C_{1-4}$-alkenoyl, halogen-substituted $C_{1-4}$-alkenoyl, monohalogenopyrimidinyl, dihalogenopyrimidinyl or trihalogenopyrimidinyl which is bonded to A and/or B via

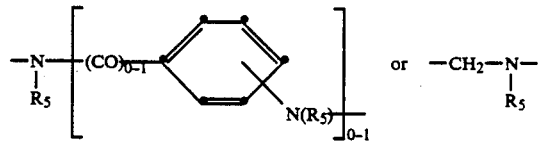

and $R_5$ is hydrogen or $C_{1-4}$-alkyl, Ka is a cation, m is 1, 2 or 3, n is 1 or 2 and the $SO_3^\ominus Ka$ group is bonded to A and/or B. These chromium complexes are suitable for dyeing nitrogen-containing or hydroxy-containing materials and they produce level dyeings having good all-round fastness properties.

3 Claims, No Drawings

FIBRE-REACTION 1:1 CHROMIUM COMPLEX AZO OR AZOMETHINE DYES HAVING A BIDENTATE CHELATING GROUP AND A MONOFUNCTIONAL NEUTRAL LIGAND

Metal complex dyes have been known for a long time and are widely used for dyeing and printing fibrous textile materials in all manner of shades. In view of the ever higher demands on these dyes, for example in relation to the levelness of the dyeings and the fastness level, the current state of the art is frequently not fully satisfactory. For instance, many existing 1:2 metal complex azo or azomethine dyes do not meet presentday demands on the levelness of the dyeings owing to lack of diffusion of the dyes in the fibre; most of the existing 1:1 metal complex azo or azomethine dyes have the disadvantage that they need to be dyed at a strongly acid pH at which some fibre materials can be damaged.

It is the object of the present invention to provide novel metal complex azo or azomethine dyes which are readily accessible and easily applied to produce dyeings which are level and also have good all-round fastness properties, in particular wet fastness properties, which meet presentday demands. It was found that this object is achieved with the novel chromium complex dyes defined hereinafter.

The present invention accordingly provides chromium complex dyes of the formula

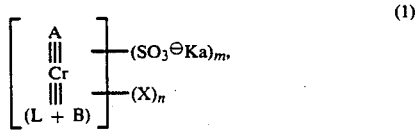

(1)

in which A is the radical of a dicyclically metallisable azo or azomethine dye, B is the radical of a monoanionic bidentate complexible organic compound which is bonded to the chromium atom via oxygen atoms, L is a colourless mono-functional ligand, X is a halogen-substituted $C_{1-4}$-alkanoyl reactive radical, a $C_{1-4}$-alkenoyl reactive radical which can be substituted by halogen, or a reactive radical of the pyrimidine series which is bonded to the radical A and/or B via a bridge member, Ka is a cation, m is 1, 2, or 3, n is 1 or 2, and the $SO_3^{\ominus}Ka$ group is bonded to the radical A and/or B.

The novel chromium complexes of the formula (1) are neutral. A bidentate complexible organic compound, the B radical thus participates in the chromium complex only with one covalent bond and one coordinate bond. As the chromium complexes of the formula (1) activate their maximum coordination number of 6, the complexes also contain a mono-functional ligand L where free electron pairs of the donor atoms are involved in the bonding.

The azo or azomethine dye radical A in the formula (1), in addition to the complexing groups, can contain the customary substituents which occur in dyes, for example alkyl groups having 1 to 5 carbon atoms, such as methyl, ethyl, propyl, isopropyl and butyl, alkoxy groups having 1 to 4 carbon atoms, such as methoxy, ethoxy, propoxy, isopropoxy and butoxy, acylamino groups having 1 to 6 carbon atoms, such as acetylamino and propionylamino, benzoylamino, amino, monoalkylamino or dialkylamino each having 1 to 4 carbon atoms in the alkyl radical, phenylamino, alkoxycarbonyl having 1 to 4 carbon atoms in the alkoxy radical, nitro, cyano, trifluoromethyl, halogen, such as fluorine, chlorine and bromine, sulfamoyl, carbamoyl, ureido, hydroxyl, $C_{1-4}$-alkylsulfonyl, for example methylsulfonyl, carboxyl, sulfomethyl and sulfo, plus one or two fibre-reactive radicals X and arylazo groups, for example a phenylazo or naphthylazo group.

An azo or azomethine dye radical A can be in particular a radical of the formula

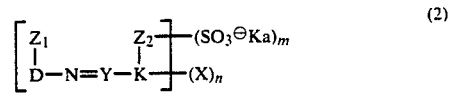

(2)

in which D is the radical of a diazo component of the benzene or naphthalene series, Y is a nitrogen atom or a CH group, K, in the event that Y is a nitrogen atom, is the radical of a coupling component, in particular of the benzene or naphthalene series or of the heterocyclic series, or in the event that Y is a CH group is the radical of an o-hydroxyaldehyde, $Z_1$, which is in the o-position to the —N=Y— radical, is a —O— or —COO— group, and $Z_2$ is a —O— or —N(R)— group where R is hydrogen, substituted or unsubstituted $C_{1-4}$alkyl, for example, methyl, ethyl, β-hydroxyethyl, isopropyl, n-propyl, sec.-butyl, isobutyl, tert.-butyl or n-butyl, or substituted or unsubstituted phenyl, and $Z_2$ is bonded to K in the adjacent position to the —N=Y— radical, and Ka, X, m and n are as defined under the formula (1).

Of the large number of possible bidentate complexible organic compounds which contain the B radical suitable compounds are chelating agents which combine with the chromium via a covalent and a coordinate bond, preferably forming a 5- or 6-membered ring with the chromium.

B is in particular the radical of a β-diketone, o-hydroxyaldehyde, o-nitrosophenol or o-nitrosonaphthol or the radical of the formulae

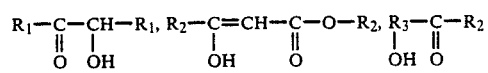

in which $R_1$ is aryl, in particular phenyl, $R_2$ is $C_{1-4}$-alkyl or aryl, in particular phenyl, and $R_3$ is aryl, in particular phenyl, the OH group being bonded to $R_3$ in the o-position relative to the carbonyl radical, and the radicals $R_1$, $R_2$ and $R_3$ are unsubstituted or substituted, for example by halogen, such as fluorine, chlorine or bromine or $C_{1-4}$-alkoxy, such as methoxy or ethoxy.

In particularly preferred compounds, B is the radical of acetylacetone, benzoylacetone, methyl acetoacetate, ethyl acetoacetate, ethyl benzoylacetate, 2-hydroxyacetophenone, 2-hydroxybenzophenone, dibenzoylmethane, tropolone, salicylaldehyde, malondialdehyde, ethyl 2-butene-3-hydroxycarboxylate or 1-phenyl-3-methyl-4-acetyl- or -4-benzoyl- pyrazol-5-one. B is in particular the radical of acetylacetone.

The monofunctional ligand L in the formula (1) is predominantly $H_2O$, $NH_3$, $R_4$-OH, $R_4$-$NH_2$, $(R_4)_2NH$, $(R_4)_3N$ or pyridine, where $R_4$ is $C_{1-4}$-alkyl, for example methyl, ethyl, propyl, isopropyl or butyl.

The fibre-reactive radical X in the formula (1) is to be understood as meaning acyl radicals which have in the molecule one or more reactive groups, or detachable substituents, which are capable of reacting, for example, with cellulose materials, specifically with the hydroxyl groups of the cellulose, in the presence of acid-binding agents and with or without the action of heat or with synthetic or natural polyamide fibres, for example wool, specifically with the NH2 groups of these fibres, to form covalent bonds.

X is preferably bonded to the radical A and/or B via an amino group which can be monoalkylated, for example —NH—, —N(CH$_3$)—, —N(C$_2$H$_5$)— or —N(C$_3$H$_7$), or via a bridge member containing an amino group.

Specific examples of reactive radicals are monohalogenopyrimidinyl, dihalogenopyrimidinyl and trihalogenopyrimidinyl radicals, such as 2,4-dichloro-5-nitro- or -5-methyl- or -5-carboxymethyl- or -5-carboxy- or -5-cyano- or -5-vinyl- or -5-sulfo- or -5-monochloromethyl- or -5-dichloromethyl- or -5-trichloromethyl- or -5-carbalkoxy-pyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2,4-dichloropyrimidin-6-yl, 2,4,5-trichloropyrimidin-6-yl, and the corresponding bromine or fluorine derivatives of the abovementioned chlorine-substituted radicals, among these for example 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-chloro-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl 4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; sulfonyl-containing pyrimidine rings, such as 2-carboxymethylsulfonyl-pyrimidin-4-yl, 2-methylsulfonyl-6-methylpyrimidin-4-yl, 2-methylsulfonyl-6-ethylpyrimidin-4-yl, 2-phenylsulfonyl-5-chloro-6-methylpyrimidin-4-yl, 2,6-bi-methylsulfonyl-pyrimidin-4-yl, 2,6-bis-methylsulfonyl-5-chloro-pyrimidin-4-yl, 2,4-bis-methylsulfonyl-pyrimidin-5-yl-sulfonyl, 2-methylsulfonylpyrimidin-4-yl, 2-phenylsulfonyl-pyrimidin-4-yl, 2-trichloromethylsulfonyl-6-methyl-pyrimidin-4-yl, 2-methylsulfonyl-5-chloro-6-methyl-pyrimidin-4-yl, 2-methylsulfonyl-5-bromo-6-methyl-pyrimidin-4-yl, 2-methylsulfonyl-5-chloro-6-ethylpyrimidin-4-yl, 2-methylsulfonyl-5-chloro-6-chloromethylpyrimidin-4-yl, 2-methylsulfonyl-4-chloro-6-methyl-pyrimidine-5-sulfonyl, 2-methylsulfonyl-5-nitro-6-methyl-pyrimidin-4-yl, 2,5,6-tris-methylsulfonyl-pyrimidin-4-yl, 2-methylsulfonyl-5,6-dimethyl-pyrimidin-4-yl, 2-ethylsulfonyl-5-chloro-6-methyl-pyrimidin-4-yl, 2-methylsulfonyl-6-chloro-pyrimidin-4-yl, 2,6-bis-methylsulfonyl-5-chloro-pyrimidin-4-yl, 2-methylsulfonyl-6-carboxy-pyrimidin-4-yl, 2-methylsulfonyl-5-sulfo-pyrimidin-4-yl, 2-methylsulfonyl-6-carbomethoxypyrimidin-4-yl, 2-methylsulfonyl-5-carboxy-pyrimidin-4-yl, 2-methylsulfonyl-5-cyano-6-methoxy-pyrimidin-4-yl, 2-methylsulfonyl-5-chloro-pyrimidin-4-yl, 2-sulfoethylsulfonyl-6-methyl-pyrimidin-4-yl, 2-methylsulfonyl-5-bromo-pyrimidin-4-yl, 2-phenylsulfonyl-5-chloro-pyrimidin-4-yl, 2-carboxymethylsulfonyl-5-chloro-6-methyl-pyrimidin-4-yl, 2-methylsulfonyl-6-chloropyrimidin-4-yl and -5-carbonyl, 2,6-bis-(methylsulfonyl)-pyrimidine-4- or -5-carbonyl, 2-ethylsulfonyl-6-chloropyrimidine-5-carbonyl, 2,4-bis-(methylsulfonyl)-pyrimidine-5-sulfonyl, 2-methylsulfonyl-4-chloro-6-methylpyrimidine-5-sulfonyl or -carbonyl.

Further examples are reactive groups of the aliphatic series, such as the acryloyl radical, monochloroacryloyl, dichloroacryloyl or trichloroacryloyl radicals or monobromoacryloyl or dibromoacryloyl radicals, such as —CO-CH=CH—Cl, COCCl=CH$_2$, —CO—CCl=CH—CH$_3$ and also -CO-CCl=CH—COOH, α- or β-bromoacryloyl, α,β-dichloropropionyl or α, β-dibromopropionyl radicals, the chloroacetyl radical and the β-chloropropionyl radical.

X in the formula (1) is in particular a monohalogenopyrimidinyl, dihalogenopyrimidinyl, trihalogenopyrimidinyl, acryloyl, monochloroacryloyl, dichloroacryloyl, trichloroacryloyl, monobromoacryloyl, dibromoacryloyl, α,β-dichloropropionyl, α, β-dibromopropionyl or chloroacetyl radical which is bonded to the radical A via a bridge member.

X is very particularly preferably a α, β-dibromopropionyl, α-bromoacryloyl or 2,6-difluoro-5-chloropyrimidinyl radical which is bonded to the radical A via an amino-containing bridge member.

The cation Ka in the formula (1) is a hydrogen, sodium, potassium, lithium or ammonium ion or the cation of an organic amine for example of triethanolamine.

Particularly preferred chromium complexes have the formula

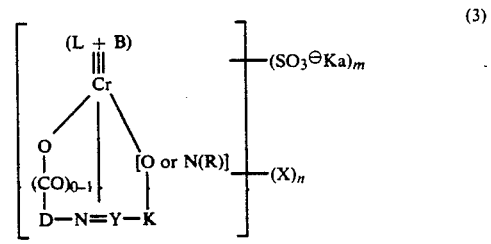

(3)

in which B is the radical of acetylacetone, benzoylacetone, methyl acetoacetate, ethyl acetoacetate, ethyl benzoylacetate, 2-hydroxyacetophenone, 2-hydroxybenzophenone, dibenzoylmethane, tropolone, salicylaldehyde, malonaldehyde, ethyl 2-butene-3-hydroxycarboxylate, 1-phenyl-3-methyl-4-acetyl- or -4-benzoylpyrazol-5-one, L is a colourless monofunctional ligand, D is the radical of a diazo component of the benzene or naphthalene series which contains the —(CO)$_{0-1}$O group in the o-position relative to the —N=Y- group, Y is a nitrogen atom or a —CH group, K, in the event that Y is a nitrogen atom, is the radical of a coupling component of the benzene or naphthalene series or the 5-pyrazolone, 5-aminopyrazole, acetoacetarylide or benzoylacetarylide series which contains the —[O or N(R)] radical adjacent to the —N=Y— radical and R is hydrogen, substituted or unsubstituted $C_1$-$C_4$-alkyl or substituted or unsubstituted phenyl or in the event that Y is a CH group K is the radical of an o-hydroxybenzaldehyde or o-hydroxynaphthaldehyde, X is α,β-dibromopropionyl, α-bromoacryloyl, β-chloroacryloyl, 2,6-difluoro-5-chloropyrimidinyl, 2-fluoro-5-chloro-6-chloromethylpyrimidinyl, 2-fluoro-5,6-dichloropyrimidinyl or 2-fluoro-5-chloro-6-methylpyrimidinyl and is bonded to D and/or K via an amino-containing bridge member, Ka is a cation, m is 1, 2 or 3, n is 1 or 2, and the $SO_3^\ominus Ka$ group is bonded to the radical D and/or K.

Y is in particular a nitrogen atom.

The fibre-reactive radical X in the formulae (1) to (3) is preferably bonded via a bridge member of the formula

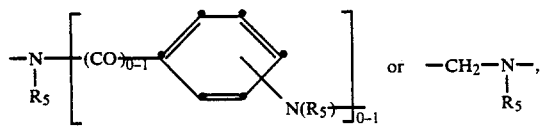

in which $R_5$ is hydrogen or $C_{1-4}$-alkyl, for example, methyl, ethyl, propyl or butyl.

Very particularly preferred chromium complexes have the formula

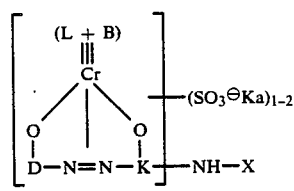
(4)

in which B is the radical of acetylacetone, benzoylacetone, ethyl acetoacetate, 2-hydroxyacetophenone, 2-hydroxybenzophenone, 1-phenyl-3-methyl-4-acetylpyrazol-5-one, 1-phenyl-3-methyl-4-benzoylpyrazol-5-one or salicylaldehyde, L, a colourless monofunctional ligand, is water, D is a benzene radical which contains the oxygen atom in the o-position relative to the azo bridge and can be substituted by sulfo, nitro, chlorine and the radical —NH—X or is a naphthalene radical which contains the oxygen atom in the o-position relative to the azo bridge and can be substituted by sulfo, nitro, and the radical —NH—X, K is a naphthalene radical which, in addition to the radical —NH—X, is substituted by 1 or 2 sulfo groups, the radical —NH—X being bonded to the naphthalene nucleus either directly or via the phenylamino radical, or is a 1-phenyl-3-methylpyrazol-5-one radical where the group —NH—X is bonded to the phenyl ring or is a 1-(2',2''-disulfostilbene)-3-methylpyrazol-5-one radical where the group —NH—X is bonded in the 4''-position, X is α,β-dibromopropionyl, α-bromoacryloyl, β-chloroacryloyl, 2,6-difluoro-5-chloropyrimidinyl, 2-fluoro-5,6-dichloropyrimidinyl, 2-fluoro-5-chloro-6-chloromethylpyrimidinyl or 2-fluoro-5-chloro-6-methyl-yl-pyrimidinyl, and Ka is an alkali metal cation, in particular $Na^\oplus$.

B in the formula (4) is in particular the radical of acetylacetone.

Other particularly preferred chromium complexes have the formula

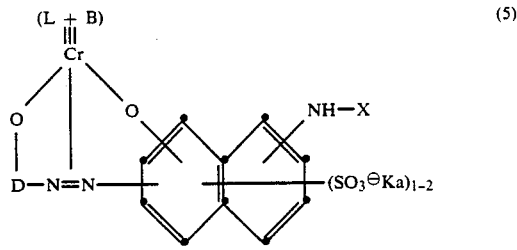
(5)

in which B, D, L and Ka are as defined under the formula (4), the azo group is bonded to the naphthalene nucleus in the o-position relative to the —O— radical, X is α, β-dibromopropionyl or α-bromoacryloyl, and the chromium complex contains no more than 1 or 2 sulfo groups.

The invention also provides a process for preparing the chromium complexes of the formula (1), which comprises reacting a bidentate complexible organic compound which contains the radical B with a 1:1 chromium complex of the formula

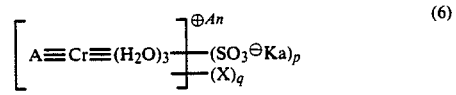
(6)

in which A and Ka are as defined under the formula (1), p is 0, 1, 2 or 3, q is 0, 1 or 2 and An is an anion, in an aqueous medium in the absence or presence of a colourless monofunctional ligand L other than water, and if desired subsequently reacting the resulting chromium complex with a compound, or compounds, which introduces the fibre-reactive radical(s) X, the radical B containing at least one sulfo group if p is 0 and at least one fibre-reactive radical X if q is 0.

The bidentate complexible organic compound is preferably reacted with the 1:1 chromium complex of the formula (6) at a temperature of 60° to 100° C. and at pH 5–11.

The reaction with a compound which introduces the reactive group(s) takes place in particular at a temperature of 15° to 30° C. and at pH 5–8.

The literature contains descriptions of many metallisable azo and azomethine dyes which can supply the radical A, for example of o,o'-dihydroxy-, o-carboxy-o'-hydroxy-, o-hydroxy-o'-aminoazo or azomethine compounds which are in particular of the formula

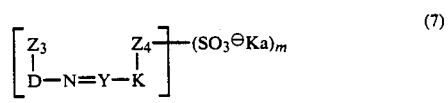
(7)

in which $Z_3$ is a hydroxyl, carboxyl or methoxy group, $Z_4$ is a hydroxyl or HN(R) group, D, K, Y, Ka, R and m are as defined under the formula (2), and D and/or K can contain the functional groups which are suitable for introducing the fibre-reactive group(s) X, for example amino groups or groups which can be converted into amino groups, such as acetylamino and nitro groups.

The compounds of the formula (7) in which Y is a nitrogen atom are prepared in a manner known per se, namely by diazotising an amine of the formula

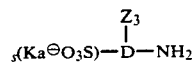 (8)

and coupling the diazo compound onto a coupling component of the formula

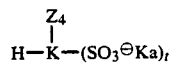 (9)

the D, K, $Z_3$, $Z_4$ and Ka in the formulae (8) and (9) being as defined under the formula (7) and s+t is m.

The diazotisation of the diazo component of the formula (8) is generally effected at low temperatures through the action of nitrous acid in an aqueous solution of a mineral acid, and the coupling onto the coupling component of the formula (9) is effected at acid, neutral or alkaline pH.

Examples of suitable amines of the formula (8) are: 2-amino-1-hydroxybenzene, 2-amino-1-methoxybenzene, anthranilic acid, 4- or 5-sulfonamidoanthranilic acid, 3- or 5-chloroanthranilic acid, 4-chloro- or 4,6-dichloro-2-amino-1-hydroxybenzene, 4- or 5- or 6-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxyphen-5-yl methyl or benzyl sulfone, 2-amino-1-hydroxyphen-4-yl methyl, ethyl, chloromethyl or butyl sulfone, 6-chloro-5-nitro- or 6-nitro-2-amino-1-hydroxyphen-4-yl methyl sulfone, 2-amino-1-hydroxybenzene-4- or -5-sulfamide, -sulf-N-methylamide or -sulf-N-β-hydroxyethylamide, 2-amino-1-methoxybenzene-4-sulfanilide, 4-methoxy-5-chloro-2-amino-1-hydroxybenzene, 4-methyl-2-amino-1-hydroxybenzene, 4-chloro-5-nitro-2-amino-1-hydroxybenzene, 5-nitro-4-methyl-2-amino-1-hydroxybenzene, 5-nitro-4-methoxy-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-5- or -6-sulfonamide, 4- or 5-chloroanisidine, 4- or 5-nitroanisidine, 2-methoxy-5-methylaniline, 2,5-dimethoxyaniline, 4- or -5- β-hydroxyethylsulfonyl-2-methoxyaniline, 4-methyl-6-sulfo-2-amino-1-hydroxybenzene, 2-amino-4-sulfo-1-hydroxybenzene, 4-chloro-6-sulfo-2-amino-1-hydroxybenzene, 6-chloro-4-sulfo-2-amino-1-hydroxybenzene, 4-chloro-5-nitro-2-amino-1-hydroxybenzene, 5-nitro-4-sulfo-2-amino-1-hydroxybenzene, 4-nitro-6-sulfo-2-amino-1-hydroxybenzene, 6-nitro-4-sulfo-2-amino-1-hydroxybenzene, 4-acetylamino-2-amino-1-hydroxybenzene, 4-acetylamino-6-sulfo-2-amino-1-hydroxybenzene, 5-acetylamino-2-amino-1-hydroxybenzene, 6-acetylamino-4-sulfo-2-amino-1-hydroxybenzene, 4-chloro-2-amino-1-hydroxybenzene-5-sulfamide, 2-amino-1-hydroxybenzene-4-(N-2'-carboxyphenyl)sulfamide, 1-amino-2-hydroxy-4-sulfonaphthalene, 1-amino-2-hydroxy-4-sulfo-6-nitronaphthalene, 1-amino-2-hydroxy-4-sulfo-6-acetamidonaphthalene, 1-amino-2-hydroxy-4,8-disulfonaphthalene, 1-amino-2-hydroxy-6-sulfonaphthalene, 1-amino-2-hydroxy-7-sulfonaphthalene, 1-amino-2-hydroxy-8-sulfonaphthalene, 2-amino-1-hydroxy-4-sulfonaphthalene, 2-amino-1-hydroxy-6-sulfonaphthalene and 2-amino-1-hydroxy-4,8-disulfonaphthalene.

The coupling components of the formula (9) can be derived, for example, from the following groups of coupling components:

naphthols which couple in the o-position relative to the OH group and can be substituted by halogen, in particular chlorine, amino, acylamino, acyl, $C_{1-4}$-alkoxy, sulfonamido, N-monosubstituted or N,N-disubstituted sulfonamido groups, sulfo and sulfonyl groups.

naphthylamines which couple in the o-position relative to the amino group and which can be substituted by halogen, in particular bromine, $C_{1-4}$-alkyl, $C_{1-4}$-alkoxy, sulfonamido, monosubstituted or disubstituted sulfonamido, sulfo or sulfonyl groups such 5-pyrazolones and 5-aminopyrazoles as have in the 1-position a phenyl or naphthyl radical which can be substituted by halogen, for example chlorine, nitro, $C_{1-4}$alkyl and alkoxy groups, sulfonamido, N-alkylated sulfonamido groups, sulfo or sulfonyl groups and in particular amino groups or acetylamino groups.

such 2,6-dihydroxy-3-cyano- or -3-carboxamido-4-alkylpyridines and 6-hydroxy-2-pyridones as are substituted in the 1-position by substituted or unsubstituted $C_{1-4}$-alkyl for example, methyl, isopropyl, β-hydroxyethyl, β-aminoethyl or γ-isopropoxypropyl, or by —$NH_2$ or a substituted amino group, for example dimethylamino or diethylamino, and carry a cyano or carboxamido group in the 3-position and a $C_{1-4}$-alkyl group, in particular methyl, in the 4-position.

such acetoacetanilides and benzoylacetanilides as can be substituted in the anilide nucleus by $C_{1-4}$-alkyl, alkoxy or alkylsulfonyl groups, $C_{1-4}$-hydroxyalkyl, alkoxyalkyl or cyanoalkylsulfonyl groups, sulfonamido or N-alkylated sulfonamido groups, sulfo and halogen and nitro, amino or acetylamino groups.

phenols which are substituted by low molecular weight acylamino groups and/or alkyl groups containing 1 to 5 carbon atoms and couple in the o-position, and hydroxyphenols, especially resorcinol.

Examples of such coupling components are: 2-naphthol, 1-naphthol, 1-hydroxynaphthalene-4-, -5- or -8-sulfonic acid or -3,5- or -4,8-disulfonic acid, 1,3- or 1,5-dihydroxynaphthalene, 1-hydroxy-7-aminonaphthalene-3-sulfonic acid, 2-naphthol-6-sulfonamide, 1-hydroxy-7-aminonaphthalene- or -7-N-methylaminonaphthalene- or -7-N-acetylaminonaphthalene3-sulfonic acid, 2-hydroxynaphth-6-yl β-hydroxyethyl sulfone, 1-hydroxy-6-aminonaphthalene- or -6-N-methylnaphthalene or -6-N-acetylaminonaphthalene-3-sulfonic acid, 1-hydroxy-7-aminonaphthalene-3,6-disulfonic acid, 1-hydroxy-6-aminonaphthalene-3,5-disulfonic acid, 1-acetylamino-7-naphthol, 1-hydroxy-6-N-(4'-aminophenyl)-aminonaphthalene-3-sulfonic acid, 1-hydroxy-5-aminonaphthalene-3-sulfonic acid, 1-propionylamino-7-naphthol, 2-hydroxy-6-aminonaphthalene-4-sulfonic acid, 2-hydroxy-8-aminonaphthalene-6-sulfonic acid, 1-carbomethoxyamino-7-naphthol, 1-hydroxy-8-aminonaphthalene-5-sulfonic acid, 1-carboethoxyamino-7-naphthol, 1-hydroxy-8-aminonaphthalene-5,7-disulfonic acid, 1-carbopropoxyamino-7-naphthol, 1-hydroxy-8-aminonaphthalene-3-sulfonic acid, 1-dimethylaminosulfonyl-amino-7-naphthol, 6- or 8-acetylamino-2-naphthol, 1-hydroxy-8-aminonaphthalene- or -8-acetylaminonaphthalene-3,5- or -3,6-disulfonic acid, 4-acetylamino-2-naphthol, 2-hydroxy-5-aminonaphthalene-4,7-disulfonic acid, 4-methoxy-1- naphthol, 4-acetylamino-1-naphthol, 1-naphthol-3-, -4-, -5- or -8-sulfonamide, 2-naphthol-3-, -4-, -5-, -6-, -7- or -8-sulfonamide, 5,8-dichloro-1-naphthol, 5-chloro-1-naphthol, 2-naphthylamine, 2-naphthylamine-1- or -6-sulfonic acid, 2-aminonaphthalene-5-, -6- or -7-sulfonamide, 2-amino-6-N-(methyl, ethyl, isopropyl, β-oxyethyl or methoxypropyl)naphthalenesulfonamide, 2-aminonaphthalene-6-sulfanilide, 2-amino-6-N-methylnaphthalenesulfanilide, 1-aminonaphthalene-3-, -4- or -5-sulfonamide, 1-aminonaphth-5-yl methyl or ethyl sulfone, 5,8-dichloro-1-aminonaphthalene, 2-phenylaminonaphthalene, 2-N-methylaminonaphthalene, 2-N-ethylaminonaphthalene, 2-phenylaminonaphthalene-5-, -6- or -7-sulfonamide, 2-(3'-chlorophenylamino)-naphthalene-5-, -6- or -7-sulfonamide, 6-methyl-2-aminonaphthalene, 6-bromo-2-aminonaphthalene, 6-methoxy-2-aminonaphthalene, 1,3-dimethylpyrazolone, 3-methyl-5-pyrazolone, 1-phenyl-3-methyl-5-pyrazolone, 1-phenyl-3-carboxamido-5-pyrazolone, 1-(2'-, 3'- or 4'-methylphenyl)-3-methyl-5-pyrazolone, 1-[3'- or 4'-(β-hydroxyethylsulfonyl)phenyl]-3-methyl-5-pyrazolone, 1-(2'-methoxyphenyl)-3-methyl-5-pyrazolone, 1-(2'-, 3'- or 4'-chlorophenyl)-3-methyl-5-pyrazolone, 1-(2'-, 3'- or 4'-nitrophenyl)-3-methyl-5-pyrazolone, 1-(2',5'- or 3',4'-dichlorophenyl)-3-methyl-5-pyrazolone, 1-(2'-, 3'- or 4'-sulfamoylphenyl)-3-methyl-5-pyrazolone, 1-(2'-, 3'- or 4'-methylsulfonylphenyl)-3-methyl-5-pyrazolone, 2,6-dihydroxy-3-cyano-4-methylpyridine, 1-methyl-3-cyano-4-ethyl-6-hydroxypyrid-2-one, 1-amino-3-cyano-4-methyl-6-hydroxypyrid-2-one, 1-phenyl-3-carboxamido-4-methyl-6-hydroxypyrid-2-one, acetoacetanilide, acetoacet-o-, -m- or -p-sulfoanilide, acetoacet-4-(β-hydroxyethylsulfonyl)anilide, acetoacet-o-anisidide, acetoacetnaphthylamide, acetoacet-o-toluidide, acetoacet-o-chloroanilide, acetoacet-m- or -p-chloroanilide, acetoacetanilide-3- or -4-sulfonamide, acetoacet-3- or -4-aminoanilide, acetoacet-m-xylidide, benzoylacetanilide, 4-methylphenol, 3-dialkylaminophenol or, in particular 3-dimethylaminophenol or 3-diethylaminophenol, 4-t-butylphenol, 4-t-amylphenol, 2- or 3-acetylamino-4-methylphenol, 2-methoxycarbonylamino-4-methylphenol, 2-ethoxycarbonylamino-4-methylphenol, 3,4-dimethylphenol and 2,4-dimethylphenol, 3-amino-4-sulfophenol, 1-(4'-aminophenyl)-3-methyl-5-pyrazolone, 1-(2'-, 3'- or 4'-sulfophenyl)-3-methyl-5-pyrazolone, 1-(2'-chloro-4'- or -5'-sulfophenyl)-3-methyl-5-pyrazolone, 1-(2'-methyl-6'-chlorophenyl)-3-methyl-5-pyrazolone, 1-(2'-methyl-4'-sulfophenyl)-3-methyl-5-pyrazolone, 1-(2'-, 3'- or 4'-chloro- or -methyl- or -sulfophenyl)-3-carboxy-5-pyrazolone, 1-[5'-sulfonaphth-2'-yl]-3-methyl-5-pyrazolone, 1-[4''-amino-2',2''-disulfostilb-4'-ene]-3-methyl-5-pyrazolone, 1-ethyl-3-cyano-4-methyl-6-hydroxypyrid-2-one, 1-ethyl-3-sulfomethyl-4-methyl-6-hydroxypyrid-2-one, 2,6-dihydroxy-4-methyl-3-sulfomethylpyridine, 2,4,6-trihydroxypyrimidine, and 1-methyl-4-hydroxyquinol-2-one.

To prepare the azomethine dyes of the formula (7), the abovementioned aromatic amines of the formula (8) are condensed in conventional manner with o-hydroxybenzaldehydes or o-hydroxynaphthaldehydes.

Examples of suitable aldehydes are: 2-hydroxybenzaldehyde, 3- or 5-methyl-2-hydroxybenzaldehyde, 3,5- or 3,6-dimethyl-2-hydroxybenzaldehyde, 5-butyl-2-hydroxybenzaldehyde, 5-chloro- or -bromo-2-hydroxybenzaldehyde, 3- or 4-chloro-2-hydroxybenzaldehyde, 3,5-dichloro-2-hydroxybenzaldehyde, 3-chloro-5-methyl-2-hydroxybenzaldehyde, 3-methyl-5-chloro-2-hydroxybenzaldehyde, 3- or 4- or 5-nitro-2-hydroxybenzaldehyde, 3,5-dinitro- or 4-chloro-5-nitro-2-hydroxybenzaldehyde, 4-methoxy-2-hydroxybenzaldehyde, 1-hydroxy-2-naphthaldehyde and its derivative chlorinated in the 4-position, and 2-hydroxy-1-naphthaldehyde.

In preferred chromium complexes according to the invention, Y is a nitrogen atom and K is the radical of a coupling component of the naphthalene series, in particular the radical of an aminonaphtholmonosulfonic or aminonaphtholdisulfonic acid.

If desired, a free amino group in the radical D and/or K can be converted into an acylamino or alkylamino group after the coupling with an acylating or alkylating agent, and similarly a hydroxyl group in the radical D and/or K can be converted by alkylation into an alkoxy group.

In a version of the process for preparing the 1:1 chromium complex azomethine dye of the formula (6), the 1:1 chromium complex of the formula (6) is prepared not with the azomethine of the formula (7) but with a mixture of the amine of the formula (8) and an o-hydroxyaldehyde.

The amines of the formula (8), the coupling components of the formula (9) and the o-hydroxyaldehydes can contain radicals which can be converted into amino groups, for example acetylamino or nitro groups. For example acetylamino groups and nitro groups can be converted into amino groups by hydrolysis and reduction respectively, advantageously after the preparation of the dyes of the formula (7) or the preparation of the 1:1 chromium complex of the formula (6).

The 1:1 chromium complexes are prepared by methods known per se. For example, the 1:1 chromium complex of the compound of the formula (6) is prepared by reacting the metal-free compound in an acid medium with a salt of trivalent chromium, such as chromium chloride, chromium fluoride or chromium sulfate, in the absence or presence of solubility promoters or chroming accelerants, for example alcohols or hydroxycarboxylic acids Afterwards, the 1:1 complex is reacted at pH 5–11 with a compound which introduces the radical B.

Examples of compounds which are particularly suitable for introducing the radical B are: acetylacetone, benzoylacetone, methyl acetoacetate, ethyl acetoacetate, ethyl benzoylacetate, 2-hydroxyacetophenone, 2-hydroxybenzophenone, dibenzoylmethane, dibenzoyl, tropolone, salicylaldehyde, malonaldehyde, ethyl 2-butene-3-hydroxycarboxylate, 1-phenyl-3-methyl-4-acetylpyrazol-5- or -4-benzoylpyrazol-5-one, 2-nitrosophenol, 2-nitrosonaphthol, 2-hydroxy-1-naphthaldehyde, and 1,3-diphenylpropane-1,3-dione.

If the reaction of the 1:1 chromium complex of the formula (6) with the organic compound introducing the radical B takes place in the presence of one of the abovementioned colourless monofunctional ligands L other than water, this produces a chromium complex of the formula

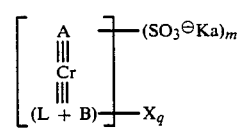

(10)

in which A, B, L, Ka, X and m are as defined under the formula (1) and q is 0, 1 or 2.

If the reactive group(s) X in the chromium complex of the formula (1) is bonded to the radical A, the reactive group(s) is advantageously introduced after the preparation of the 1:1 chromium complex of the formula (6) or preferably after the reaction of the 1:1 chromium complex of the formula (6) with the organic compound introducing the radical B. If the reactive group(s) X in the chromium complex of the formula (1) is bonded to the radical B, it is preferably introduced after the reaction with the 1:1 chromium complex of the formula (6).

The fibre-reactive group(s) X is or are introduced into the 1:1 chromium complex of the formula (6) or into the chromium complex of the formula (10) in a manner known per se by reacting these chromium complexes with one or two agents introducing or forming the radical(s) X; the radicals A and/or B in the formulae (6) and (10) have to contain functional groups which are suitable for introducing the fibre-reactive group(s) X. Examples of groups suitable for introducing the radicals X are unsubstituted or monoalkylated amino groups, H such as —NH$_2$, —N(CH$_3$)H or —N(C$_2$H$_5$)H.

The reactive group(s) which is or are bonded via an oxy, thio or preferably amino group is or are introduced by reacting the chromium complexes of the formulae (6) and (10) with one or two acylating agents which introduce one or two identical or different radicals X.

The invention also provides a process for dyeing textile materials with chromium complexes, which comprises using an aqueous liquor which contains a compound introducing the radical B, the 1:1 chromium complex of the formula

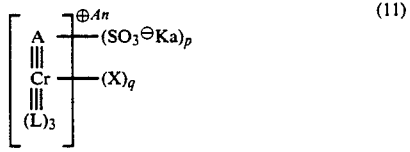

which A, L and X are as defined under the formula (1), p is 0 to 3, q is 0 to 2 and An is an anion, and the textile material and can, if desired, also contain further additives, heating the liquor to 100° C. in continuous or stepwise fashion and then bringing it to an alkaline pH, and completing the dyeing, and wherein if p is 0 the radical B contains at least one sulfo group and if q is 0 at least one fibre-reactive radical X.

In particular, the compound introducing the radical B and the 1:1 chromium complex of the formula (11) are deployed in a molar ratio of 2:1 to preferably 1:1.

In a preferred version of the process, the dyeing liquor, which contains the abovementioned components, is raised to 60° to 80° C. in the course of 10 to 45 minutes, is maintained at said temperature for 10 to 45 minutes, is then raised to 100° C. in the course of 10 to 30 minutes, is maintained at said temperature for 30 to 90 minutes, is cooled down to 85° C., and is brought to pH 8–9 and is used to aftertreat the dyeing at 85° C. for a further 10 to 30 minutes.

Examples of the further additives which the liquor may contain are inorganic or organic acids, in particular acetic acid, alkali metal or ammonium salts, in particular ammonium sulfate, and, if desired, a levelling agent.

As described above, the chromium complex of the formula (11) is obtained by reacting an azo or azomethine dye, in particular such a dye of the formula (2), in the presence or absence of a ligand L other than water, with one of the chroming agents mentioned and the fiber-reactive radicals can be introduced at any point of the process, but preferably after the preparation of the 1:1 chromium complex.

In the process according to the invention use is made in particular of 1:1 chromium complexes of the formula

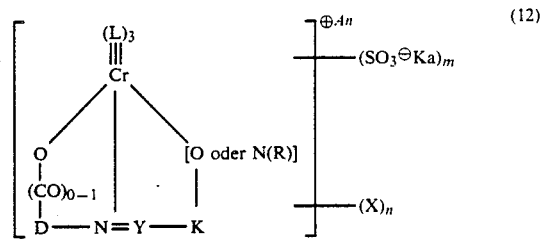

in which D, K, L, R, Ka, X, m and n are as defined under the formula (3) and An is an anion, preferably of chromium complexes of the formula

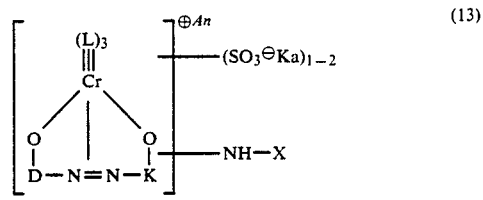

in which D, K, L, Ka and X are as defined under the formula (4) and An is an anion.

In the process according to the invention, the compound introducing the radical B can be any one of the abovementioned compounds, and acylatable amino groups which are present in the radical B and which are not involved in the formation of the complex can have been previously reacted with an acylating agent introducing the fibre-reactive radical X. The compound introducing the radical B can be in particular one of those mentioned under the formulae (3) and (4).

The process according to the invention can be carried out in the absence or presence of a colourless monofunctional compound L other than water, such as one of the abovementioned compounds.

In particular, the process according to the invention is carried out with acetylacetone as the compound introducing the radical B and with the 1:1 chromium complex of the formula

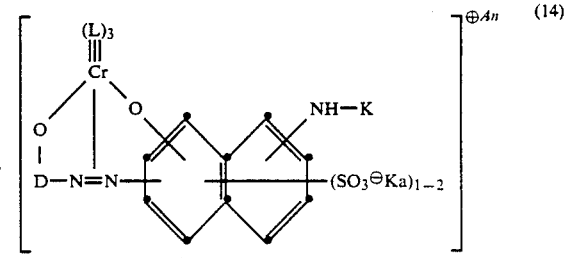

in which D, L, Ka and X are as defined under the formula (5) and An is an anion.

In the process according to the invention, the chromium complex of the formula (1) is thus formed during the dyeing and produces the same colouristic advantages as are obtained with the dyes of the formula (1) which are prepared in substance and isolated.

The novel chromium complexes of the formula (1) and the chromium complexes prepared in the novel dyeing method are suitable for dyeing nitrogen-containing or hydroxyl-containing materials, such as wool, silk, leather, nylons and cotton. They produce level dyeings in yellow, brown, orange, red, blue, grey, green and black shades having good all-round fastness properties, in particular very good rub, wet, wet rub and light fastness. Furthermore, the dyes according to the invention are very compatible with fibre-reactive acid dyes. The abovementioned textile material can have been processed into many different forms, for example fibre form, yarn form or woven or knitted fabric form.

In the following examples the parts are by weight. The temperatures are given in degrees centigrade. Parts by weight relate to parts by volume as the gram relates to the cubic centimeter.

EXAMPLE 1

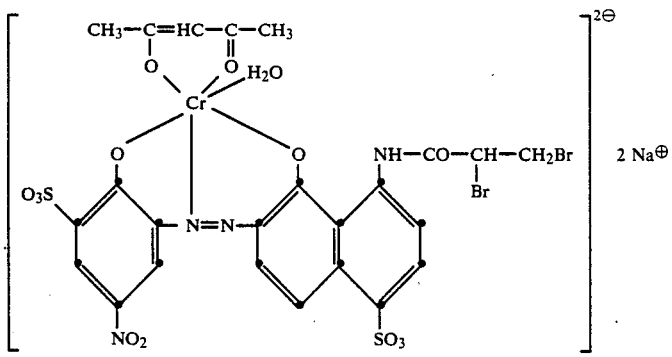 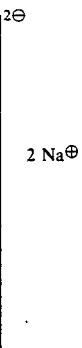

48.44 parts of a monoazo dye which is obtained by diazotising 4-nitro-6-sulfo-2-aminophenol and coupling the diazo compound onto 1-naphthol-8-amino-5-sulfonic acid are converted in conventional manner into the 1:1 chromium complex. The product is suspended in 400 parts of water, and 10.0 parts of acetylacetone are added. The suspension is heated to 75°–80° while a pH of 7–7.3 is maintained with 2N NaOH, and turns into a solution. Said solution is stirred at 75°–80° for 1 hour under constant pH control.

After the adduct formation has ended, the reaction solution is cooled down to 20°–25°. 34 parts of dibromopropionyl chloride, diluted with 5 ml of acetone, are added dropwise at 20°–25° in the course of 20–30 minutes, and the pH is maintained at 6.5–7 with 2N NaOH. After 2 hours of stirring under pH control the reactive chromium complex obtained is clarified, and the solution is evaporated to dryness. The dye obtained dyes wool by the method of Dyeing Example 2 in navy shades having excellent fastness properties.

EXAMPLE 2

53.9 parts of the 1:1 chromium complex of a monoazo dye obtained by alkaline coupling of 1-diazo-2-naphthol-4-sulfonic acid onto 2-amino-5-naphthol-7-sulfonic acid are dissolved at pH 7 in 500 parts of water using dilute sodium hydroxide solution. After addition of 10.0 parts of acetyl-acetone the pH is adjusted to 6.5 with dilute sodium hydroxide solution and the reaction mixture is stirred at 90°–95° C. for 30 minutes. The dye solution is cooled down to 50° C., and 15 parts of sodium bicarbonate are added. After stirring for 10 minutes it is cooled down to 10°–15° C. with 200 parts of ice, 30 parts of 1,2-dibromopropionyl chloride are added dropwise in the course of about 1 hour, and the mixture is stirred at room temperature for a further 2–3 hours. The resulting, dissolved dye of the formula

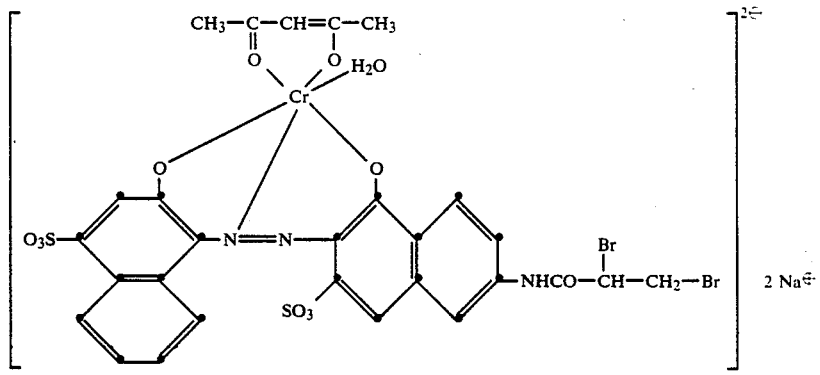

is evaporated to dryness. The dye, obtained in the form of a very readily water-soluble dark powder, dyes wool by the method of Dyeing Example 2 in dark blue shades having excellent fastness properties.

Further dyes with similar properties are obtained analogously by reacting the 1:1 chromium complexes of the monoazo compounds given in column I of Table I below with the colourless compounds listed in column II and subsequently acylating the resulting 1:2 chromium complex with 1,2-dibromopropionyl chloride.

These dyes dye wool in the shades given in column III.

| Example | I | II | III |
|---|---|---|---|
| 3 | [structure: HO₃S- and NO₂-substituted phenol-OH with N=N azo link to naphthalene bearing OH, SO₃H, NH₂] | acetylacetone | reddish grey |
| 4 | [structure: HO₃S- and NO₂-substituted naphthol-OH with N=N azo link to naphthalene bearing OH, SO₃H, NH₂] | ethyl acetoacetate | greenish grey |
| 5 | [structure: HO₃S-substituted naphthol-OH with N=N azo link to naphthalene bearing OH, SO₃H, NH₂] | " | blue |
| 6 | [structure: HO₃S- and NO₂-substituted phenol-OH with N=N azo link to naphthalene bearing OH, SO₃H, NH₂] | benzoylacetone | reddish grey |
| 7 | " | 2-hydroxyacetophenone | greenish grey |
| 8 | " | ethyl acetoacetate | grey |
| 9 | [structure: HO₃S-substituted naphthol-OH with N=N azo link to naphthalene bearing OH, SO₃H, NH₂] | benzoyl acetone | blue |
| 10 | " | 2-hydroxyacetophenone | blue |
| 11 | [structure: HO₃S- and NO₂-substituted naphthol-OH with N=N azo link to naphthalene bearing OH, SO₃H, NH₂] | benzoylacetone | grey |

-continued

| Example | I | II | III |
|---|---|---|---|
| 12 | " | 2-hydroxyaceto-phenone | grey |
| 13 | " | acetylacetone | grey |
| 14 | [structure: 3-sulfo-5-nitro-2-hydroxyphenyl-azo-1-hydroxy-3-sulfo-6-amino-naphthalene] | benzoylacetone | reddish grey |
| 15 | [structure: 2-hydroxy-4-sulfo-phenyl-azo-1-hydroxy-3-sulfo-6-amino-naphthalene] | 1-phenyl-3-methyl-4-acetylpyrazol-5-one | violet-tinged grey |
| 16 | [structure: 2-hydroxy-4-sulfo-phenyl-azo-1-hydroxy-3-sulfo-6-amino-naphthalene] | ethyl acetoacetate | violet |
| 17 | " | acetylacetone | violet |
| 18 | " | benzoylacetone | violet |
| 19 | [structure: 2-hydroxy-4-nitro-5-sulfo-phenyl-azo-1-hydroxy-3-sulfo-6-amino-naphthalene] | acetylacetone | grey |
| 20 | [structure: 2-hydroxy-4-nitro-phenyl-azo-1-hydroxy-3-sulfo-6-amino-naphthalene] | acetylacetone | bluish grey |
| 21 | [structure: complex stilbene-bis-azo compound with 2-hydroxy-4-nitrophenyl, methyl, hydroxy, aminosulfostilbene groups] | acetylacetone | orange |
| 22 | " | benzoylacetone | orange |
| 23 | " | 2-hydroxyaceto-phenone | orange |

-continued

| Example | I | II | III |
|---|---|---|---|
| 24 | " | 1-phenyl-3-methyl-4-benzoylpyrazol-5-one | orange |
| 25 | (structure: naphthalene with OH, HO₃S, NO₂, N=N linked to pyrazolone with HO, CH₃, N=N-phenyl-NH₂) | acetylacetone | red |
| 26 | " | benzoylacetone | red |
| 27 | " | ethyl acetoacetate | red |
| 28 | (structure: chlorophenol-OH with N=N to naphthalene with OH, NH₂, SO₃H, SO₃H) | acetylacetone | navy |
| 29 | " | benzoylacetone | navy |
| 30 | " | ethyl acetoacetate | bluish grey |
| 31 | " | 2-hydroxyacetophenone | bluish grey |
| 32 | (structure: HO₃S, OH, Cl phenyl with N=N to naphthalene with OH, NH₂, SO₃H) | acetylacetone | navy |
| 33 | " | benzoylacetone | navy |
| 34 | (structure: HO₃S, OH, Cl phenyl with N=N to naphthalene with OH, NH₂, SO₃H) | 2-hydroxyacetophenone | navy |
| 35 | " | ethyl acetoacetate | bluish grey |
| 36 | " | 1-phenyl-3-methyl-4-acetylpyrazol-5-one | grey |
| 37 | (structure: Cl, OH phenyl with N=N to naphthalene with OH, NH₂, SO₃H, SO₃H) | acetylacetone | bluish grey |
| 38 | " | benzoylacetone | bluish grey |
| 39 | " | 2-hydroxyacetophenone | grey |

-continued

| Example | I | II | III |
|---|---|---|---|
| 40 | " | ethyl acetoacetate | grey |
| 41 | (structure: 4-chloro-2-hydroxy-5-sulfophenyl azo coupled to 1-hydroxy-8-amino-3-sulfonaphthalene) | acetylacetone | navy |
| 42 | " | benzoylacetone | navy |
| 43 | " | 2-hydroxyacetophenone | blue |
| 44 | " | ethyl acetoacetate | blue |
| 45 | (structure: 5-chloro-2-hydroxy-4-nitrophenyl azo coupled to hydroxy-sulfo-amino naphthalene) | acetylacetone | grey |
| 46 | (structure: 2-hydroxy-3-sulfo-5-nitrophenyl azo coupled to 1-hydroxy-3-sulfo-naphthalene with NH-phenyl-NH₂) | acetylacetone | grey |
| 47 | " | 1-phenyl-3-methyl-4-acetylpyrazol-5-one | olive grey |
| 48 | (structure: 3-sulfo-5-nitro-2-hydroxyphenyl azo coupled to 1-hydroxy-3-sulfo-8-amino-naphthalene) | acetylacetone | grey |
| 49 | " | benzoylacetone | grey |
| 50 | " | 2-hydroxyacetophenone | grey |
| 51 | " | ethyl acetoacetate | grey |
| 52 | (structure: 6-amino-3-sulfo-2-hydroxynaphthyl azo coupled to 1-hydroxy-8-sulfo-naphthalene) | acetylacetone | grey |
| 53 | " | benzoylacetone | grey |

-continued

| Example | I | II | III |
|---|---|---|---|
| 54 | " | 2-hydroxyacetophenone | grey |
| 55 | " | ethyl acetoacetate | grey |
| 56 | 2-hydroxy-4-nitrophenyl–N=N–(1-hydroxy-3-sulfo-6-amino-7-sulfo-2-naphthyl) | acetylacetone | grey |
| 57 | " | benzoylacetone | grey |
| 58 | " | 2-hydroxyacetophenone | grey |
| 59 | " | ethyl acetoacetate | grey |
| 60 | 2-hydroxy-4-sulfamoylphenyl–N=N–(1-hydroxy-3-sulfo-6-amino-2-naphthyl) | acetylacetone | grey |
| 61 | 2-hydroxy-3,5-dichlorophenyl–N=N–(1-hydroxy-3-sulfo-6-sulfo-8-amino-2-naphthyl) | benzoylacetone | navy |
| 62 | " | acetylacetone | reddish navy |
| 63 | 2-hydroxy-5-chlorophenyl–N=N–(1-hydroxy-3-sulfo-6-sulfo-8-amino-2-naphthyl) | salicylaldehyde | navy |
| 64 | 2-hydroxy-3-sulfo-5-chlorophenyl–N=N–(1-hydroxy-3-sulfo-8-amino-2-naphthyl) | salicylaldehyde | navy |

| Example | I | II | III |
|---|---|---|---|
| 65 | ![structure: 4-nitro-6-sulfo-2-hydroxyphenyl-azo-pyrazolone with p-aminophenyl on N and CH3, OH, HO substituents] | benzoylacetone | orange |

Further dyes with similar properties are obtained analogously by reacting the 1:1 chromium complexes of the aminoazo compounds which are given in column I of Table II below and which have been reacted with the reactive groups indicated in column II, with the colorless compounds listed in column III. The novel dyes produce level dyeings on wool in the shades indicated in column IV.

| Example | I | II | III | IV |
|---|---|---|---|---|
| 66 | [4-chloro-2-hydroxyphenyl-azo-1-hydroxy-8-amino-3,6-disulfonaphthalene] | $Cl-\overset{O}{\underset{\|}{C}}-\overset{Br}{\underset{\|}{CH}}-CH_2Br$ | acetylacetone | navy |
| 67 | " | " | benzoylacetone | navy |
| 68 | " | " | 2-hydroxybenzophenone | navy |
| 69 | " | " | ethyl acetoacetate | bluish grey |
| 70 | [4-chloro-2-hydroxyphenyl-azo-1-hydroxy-8-amino-3,6-disulfonaphthalene] | $Cl-\overset{O}{\underset{\|}{C}}-\overset{Br}{\underset{\|}{CH}}-CH_2Br$ | 1-phenyl-3-methyl-4-benzoylpyrazol-5-one | bluish grey |
| 71 | " | $Cl-\overset{O}{\underset{\|}{C}}-\overset{Br}{\underset{\|}{C}}=CH_2$ | acetylacetone | grey |
| 72 | " | [fluorinated pyrimidine ring with Cl and F substituents] | acetylacetone | grey |
| 73 | [5-sulfo-4-nitro-2-hydroxyphenyl-azo-1-hydroxy-8-amino-5-sulfonaphthalene] | $Cl-\overset{O}{\underset{\|}{C}}-\overset{Br}{\underset{\|}{CH}}-CH_2Br$ | 2-hydroxybenzophenone | navy |
| 74 | " | " | ethyl acetoacetate | grey |

-continued

| Example | I | II | III | IV |
|---|---|---|---|---|
| 75 | 2-hydroxynaphthalene coupled via N=N to chloro-hydroxyphenyl, with OH, NH₂, SO₃S, SO₃H substituents (chloro-hydroxyphenyl–N=N–aminohydroxynaphthalenedisulfonic acid) | Trifluoro-chloro-pyrimidine derivative | 2-hydroxyacetophenone | greenish black |
| 76 | Same aryl core as 75 with OH, NH₂, SO₃H, SO₃H; chlorophenol coupling component | Cl–CO–CH=CH–Cl | acetylacetone | blue |
| 77 | Nitro-sulfo-hydroxyphenyl–N=N–aminohydroxynaphthalenesulfonic acid | Cl–CO–CH=CH–Cl | acetylacetone | greenish blue |
| 78 | Nitro-sulfo-hydroxyphenyl–N=N–aminohydroxynaphthalenesulfonic acid | Cl–CO–CHBr–CH₂Br | benzoylacetone | blue |
| 79 | Hydroxy-sulfonaphthyl–N=N–aminohydroxynaphthalenesulfonic acid | Fluoro-chloro-chloromethyl-pyrimidine | acetylacetone | blue |
| 80 | " | Fluoro-chloro-methyl-pyrimidine | acetylacetone | blue |
| 81 | " | Fluoro-trichloro-pyrimidine | acetylacetone | blue |

-continued

| Example | I | II | III | IV |
|---|---|---|---|---|
| 82 | [structure: naphthalene with OH, SO₃H, NH₂ groups, azo-linked to naphthalene with OH, SO₃H] | ClCOCBr=CH₂ | acetylacetone | grey |
| 83 | [structure: chlorophenol with Cl, OH, SO₃H, azo-linked to naphthalene with OH, SO₃H, NH₂] | ClCOCHBrCH₂Br | acetylacetone | violet |
| 84 | [structure: phenol with OH, SO₃H, Cl, azo-linked to naphthalene with OH, SO₃H, NH₂] | ClCOCHBrCH₂Br | acetylacetone | greyish blue |
| 85 | [structure: phenol with SO₃H, OH, NO₂, azo-linked to naphthalene with OH, SO₃H, NH₂] | ClCOCHBrCH₂Br | acetylacetone | grey |
| 86 | [structure: phenol with OH, NO₂, azo-linked to naphthalene with OH, SO₃H, SO₃H, NH₂] | ClCOCHBrCH₂Br | acetylacetone | blue |
| 87 | [structure: phenol with OH, Cl, azo-linked to naphthalene with OH, SO₃H, SO₃H, NH₂] | ClCOCHBrCH₂Br | acetylacetone | bluish violet |

| Example | I | II | III | IV |
|---|---|---|---|---|
| 88 | 6-amino-1-hydroxy-2-[(2-hydroxy-5-amino-3-sulfophenyl)azo]naphthalene-3-sulfonic acid | ClCOCHBrCH₂Br | acetylacetone | grey |
| 89 | 6-amino-1-hydroxy-2-[(5-chloro-2-hydroxy-3-sulfophenyl)azo]naphthalene-3-sulfonic acid | ClCOCHBrCH₂Br | acetylacetone | violet |
| 90 | 6-amino-2-[(5-chloro-2-hydroxy-3-sulfophenyl)azo]-3-hydroxynaphthalene-4-sulfonic acid | ClCOCHBrCH₂Br | acetylacetone | navy |
| 91 | 7-amino-1-hydroxy-2-[(5-chloro-2-hydroxy-3-sulfophenyl)azo]naphthalene-3-sulfonic acid | ClCOCHBrCH₂Br | acetylacetone | violet |
| 92 | 6-amino-2-[(3,5-dichloro-2-hydroxyphenyl)azo]-3-hydroxynaphthalene-5,7-disulfonic acid | ClCOCHBrCH₂Br | acetylacetone | reddish grey |
| 93 | 6-amino-2-[(3-chloro-2-hydroxy-5-nitrophenyl)azo]-3-hydroxynaphthalene-5,7-disulfonic acid | ClCOCHBrCH₂Br | acetylacetone | violet |
| 94 | 6-amino-2-[(5-chloro-2-hydroxy-3-nitrophenyl)azo]-3-hydroxynaphthalene-5,7-disulfonic acid | ClCOCHBrCH₂Br | acetylacetone | grey |

| Example | I | II | III | IV |
|---|---|---|---|---|
| 95 | 2-hydroxy-4-nitrophenyl azo coupled to 1-hydroxy-naphthalene with SO₃H groups and NH₂ (structure shown) | ClCOCHBrCH₂Br | acetylacetone | greenish grey |

EXAMPLE 96

41.9 parts of the monoazo dye prepared from diazotised 1-hydroxy-2-amino-4-nitrobenzene-6-sulfonic acid and 1-phenyl-3-methyl-5-pyrazolone, in the form of the 1:1 chromium complex which contains 1 atom of chromium per molecule of azo compound, are suspended with stirring in 600 parts of water at 60°–70° C. and are brought into solution by adding 5N sodium hydroxide solution to pH 9.0–9.5. A solution of 36.0 parts of crystalline sodium sulfide (Na₂S×9H₂O) in 100 parts of water is then added dropwise at the same temperature of 60°–70° C. in the course of 1 hour. The reduction of the nitro group, accompanied by a change in colour from yellowish orange to orange-tinged red, is complete after 2–3 hours of stirring at the same temperature. The resulting, amino-containing 1:1 chromium complex is precipitated by neutralising the reaction solution and adding sodium chloride, is filtered off and is washed with dilute sodium chloride solution.

The resulting filter cake is suspended in 600 parts of water at 60°–65° and is dissolved at pH 8.5–9.0 by adding 2N sodium hydroxide solution. After addition of 10.0 parts of acetylacetone the reaction mixture is stirred at pH 8.0–9.0 and 60°–70° C. until the reaction of the 1:1 chromium complex with the ligand has ended. The resulting orange-tinged red reaction solution is then cooled down to 10°–15° C., and a solution of 30 parts of 1,2-dibromopropionyl chloride in 30 parts of acetone is added in the course of 1 hour during which the pH range of 6.0–6.5 is maintained by the dropwise addition of 2N sodium hydroxide solution. After a further 2 hours of stirring at room temperature the metal complex of the following structure

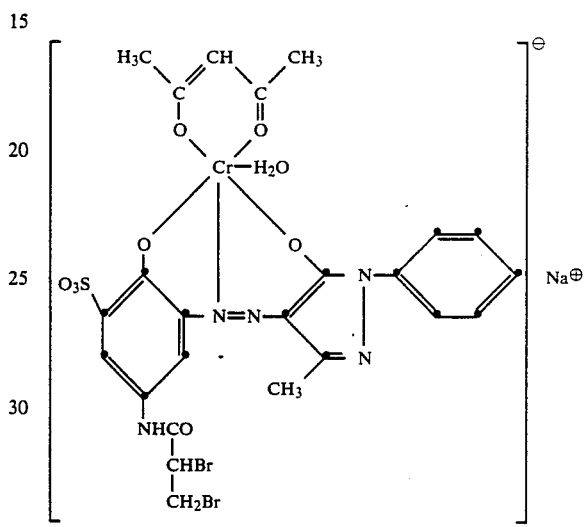

is precipitated out of the reaction solution by adding sodium chloride, is filtered off and is dried at 70° C. in vacuo.

The novel, water-soluble dye produces on wool materials by the indicated dyeing method full and wet- and light-fast orange shades.

If, for the reaction with the amino-containing 1:1 chromium complex, acetylacetone is replaced by 16.2 parts of benzoylacetone, this produces a somewhat more reddish orange dye having the same colouristic properties.

Further dyes with similar properties are prepared analogously by reacting the amino-containing monoazo compounds indicated in column I of Table III below in the form of 1:1 chromium complexes with the colourless compounds listed in column II and then acylating the resulting chromium complex with 1,2-dibromopropionyl chloride. Column III gives the shades which can be obtained with the novel dyes on wool.

| Example | I | II | III |
|---|---|---|---|
| 97 | HO₃S-substituted hydroxyphenyl azo-hydroxyphenyl with NH₂ and C(CH₃)₃ groups (structure shown) | CH₃CCH₂CCH₃ (with two C=O groups) | reddish brown |

-continued
| Example | I | II | III |
|---|---|---|---|
| 98 | " | 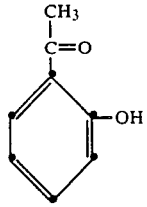 (CH3-C(=O)-phenyl-OH) | brown |
| 99 | 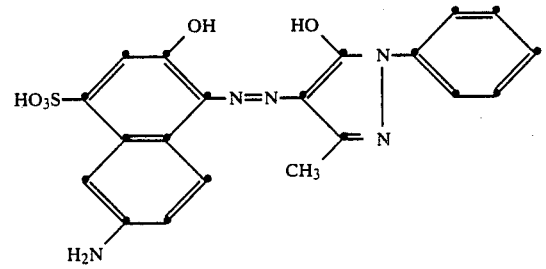 | 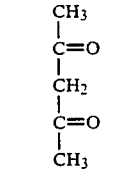 (CH3-CO-CH2-CO-CH3) | red |
| 100 | " | 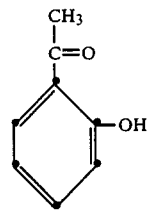 (CH3-C(=O)-phenyl-OH) | bluish red |
| 101 | 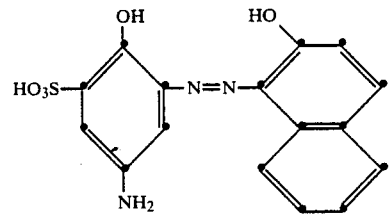 | 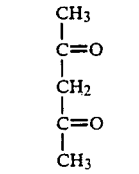 (CH3-CO-CH2-CO-CH3) | violet-tinged grey |
| 102 | 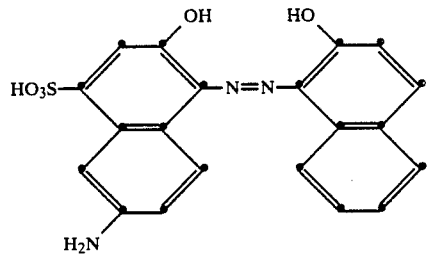 | 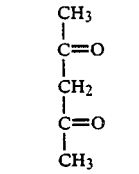 (CH3-CO-CH2-CO-CH3) | blue |
| 103 | " | 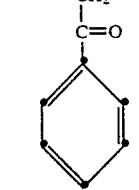 (CH3-CO-CH2-CO-phenyl) | greyish blue |

-continued
| Example | I | II | III |
|---|---|---|---|
| 104 | " | 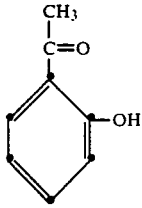 | greyish blue |
| 105 | 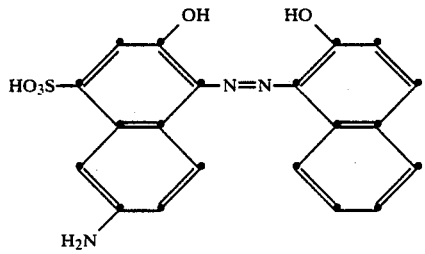 | 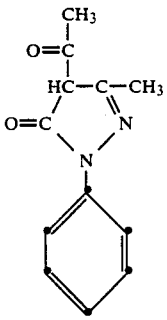 | greenish grey |
| 106 | 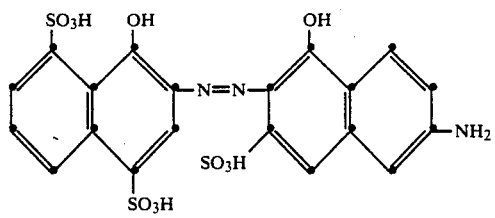 | CH$_3$—C—CH$_2$—C—CH$_3$<br>    ‖         ‖<br>    O          O | greyish blue |
| 107 | 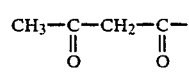 | " | blue |
| 108 | 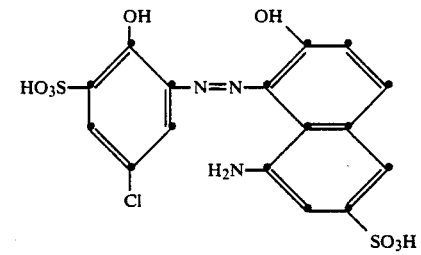 | 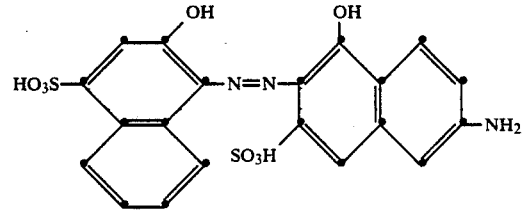 | blue |

DYEING EXAMPLE 1

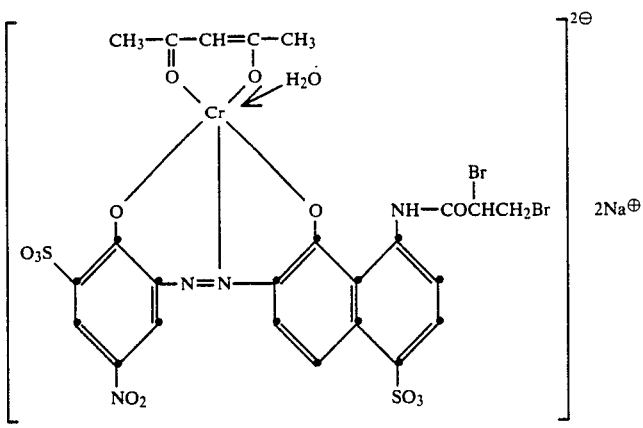

in the dyebath and dyeing at the same time. 10 parts of wool fabric are introduced at 40° into a dyebath which contains, per 340 parts of water, 0.66 part of the 1:1 chromium complex of the formula

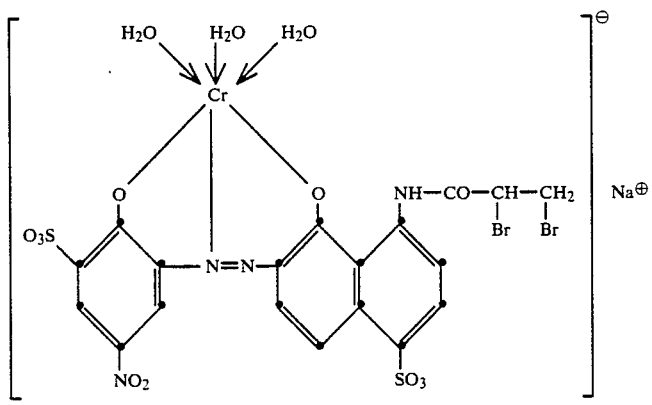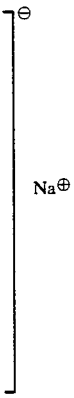

0.66 part of acetylacetone, 0.4 part of ammonium sulfate, 0.4 part of 80% acetic acid and 0.2 part of a levelling assistant.

The dyebath is raised to 70°–75° in the course of 20 minutes and is then held at that temperature for 30 minutes. It is raised to 100° C. in the course of 15 minutes and is held at that temperature for 90 minutes. The temperature is allowed to fall to 85° in the course of 5 minutes; and the bath is brought to about pH 8.5 with 0.4 part of a 25% ammonia solution. The wool fabric is removed from the liquor after 15 minutes at 85° and is rinsed. It has a level navy colour.

DYEING EXAMPLE 2

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 4000 parts of water at 50°.

4 parts of the dye obtained as described in Example 2 are dissolved in 100 parts of hot water, and this solution is added to the above dyebath 100 parts of prewetted wool knitting yarn are then entered into the dyebath, and the temperature of the bath is raised from 50° to 80° in the course of 30 minutes. After 20 minutes of dyeing at 80° the dyebath is heated to the boil and dyeing continues at the boil for 90 minutes. Almost all the dye exhausts onto the substrate. After the bath has cooled down to 80° the pH is raised from about 4.5 to a constant pH of 8.5 by adding ammonia solution, and the dyed material is after-treated at this temperature for 20 minutes. Thorough rinsing with hot and cold water, acidifying with 1 part of 80% formic acid, centrifuging and drying produces a dark blue wool yarn of very good wet and rub fastness and excellent light fastness.

DYEING EXAMPLE 3

A wool fabric with an antifelting finish is impregnated with the preparation described hereinafter and is squeezed off on a pad-mangle to a moisture pick-up of 250%:

| | |
|---|---|
| 4 | parts of Diaprint REG (acid-resistant thickener) |
| 1 | part of sulfamic acid |
| 0.2 | part of thymene |
| 0.2 | part of emulsifier |
| 94.6 | parts of water |
| 100 | parts |

The impregnated material is then put into a heatable press together with a transfer paper which bears a print design applied with the dye of Example 3 in conventional manner, and at 100° to 105° is put under a pressure of about 0.5 kg/cm² for 3 minutes. The rinsed and dried wool fabric has a corresponding black print design of very good fastness properties.

DYEING EXAMPLE 4

A piece of chlorinated wool flannel is impregnated on a pad-mangle with the preparation of dye described hereinafter and is squeezed off to a liquor pick-up of 100%

| | |
|---|---|
| 50 | parts of the dye of Example 13 |
| 300 | parts of urea |
| 320 | parts of Solvitose OFA at 4% (thickener) |
| 10 | parts of a mixture of anionic fatty alcohol ether sulfate with nonionic wetting agents |
| 10 | parts of the levelling agent used in Dyeing Example 2 |
| 10 | parts of sodium metabisulfate |
| 10 | parts of 80% acetic acid |
| 290 | parts of water |
| 1000 | parts of padding liquor |

The impregnated fabric is wound into a roll and packed airtight and is stored in this state at room temperature for 48 hours. The material is rinsed with cold water and then treated in a fresh bath with sufficient 24% ammonia to produce pH 8.5 and is held at 80° for 15 minutes. It is rinsed in warm water and finally acidified with 80% acetic acid and dried. The wool fabric has a full black colour of excellent fastness properties.

DYEING EXAMPLE 5

A piece of chlorinated wool flannel is impregnated on a pad-mangle with the preparation of dye described hereinafter and is squeezed off to a liquor pick-up of 100%:

| | |
|---|---|
| 50 | parts of the dye of Example 56 |
| 300 | parts of Solvitose OFA at 40% (thickener) |
| 20 | parts of a mixture of anionic fatty alcohol ether sulfate with nonionic wetting agents |
| 10 | parts of the levelling agent used in Dyeing Example 2 |
| 20 | parts of 80% acetic acid |
| 600 | parts of water |
| 1000 | parts of padding liquor |

The impregnated fabric is then put into a steamer and is treated with saturated steam for 20 to 40 minutes. The material is rinsed with cold water and is then treated in a fresh bath with sufficient 24% ammonia solution as to produce a pH of 8.5 and is held at 80° for 15 minutes. After rinsing in warm water the fabric is finally acidified with 80% acetic acid and is dried. The wool fabric is in a full black shade of excellent fastness properties.

DYEING EXAMPLE 6

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 1000 parts of water at 50°.

3 parts of the dye obtained in Example 17 are dissolved in 100 parts of hot water, and this solution is added to the above dyebath. A circulation dyeing apparatus is charged with 100 parts of prewetted slubbing on cops, the temperature of the bath is raised from 50° to 97°–99° in the course of 30 minutes, and dyeing then proceeds for 90 minutes at the boil. Almost all the dye exhausts onto the substrate. After the bath has cooled down to 80° it is brought from about pH 4.5 to a constant pH of 8.5 by adding ammonia solution, and the dyed material is after-treated at said temperature. Thorough rinsing with hot and cold water, acidifying with 1 part of 80% formic acid, centrifuging and drying produce a dark violet material of very good wet fastness and excellent light fastness.

DYEING EXAMPLE 7

6 parts of 80% acetic acid, 3 parts of the ammonium salt of the acid sulfuric acid ester of the adduct of a fatty amine (comprising 30% hexadecylamine, 25% octadecylamine and 45% octadecenylamine and 7 moles of ethylene oxide) and 6 parts of ammonium sulfate are dissolved in succession in 1000 parts of water at 50°.

3 parts of the dye obtained in Example 2 are dissolved in 100 parts of hot water, and this solution is added to the above dyebath. A circulation dyeing apparatus is charged with 150 parts of prewetted loose wool, the temperature of the liquor is raised from 50° to 97°–99° in the course of 30 minutes, and dyeing then proceeds at the boil for 90 minutes. Almost all the dye exhausts onto the substrate. After the liquor has cooled down to 80° it is brought from about pH 4.5 to a constant pH of 8.5 by adding ammonia solution, and the dyed material is after-treated at said temperature for 20 minutes. Thorough rinsing with hot and cold water, acidifying with 1 part of 80% formic acid, centrifuging and drying produces a level dark blue substrate having good wet and rub fastness and excellent light fastness.

DYEING EXAMPLE 8

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 4000 parts of water at 50°.

0.45 part of the dye obtained in Example 2 and 0.30 part of the yellow dye of the formula

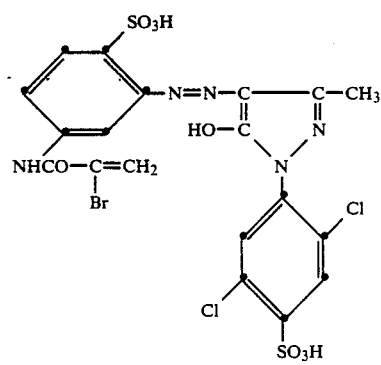

and 0.40 part of the red dye of the formula

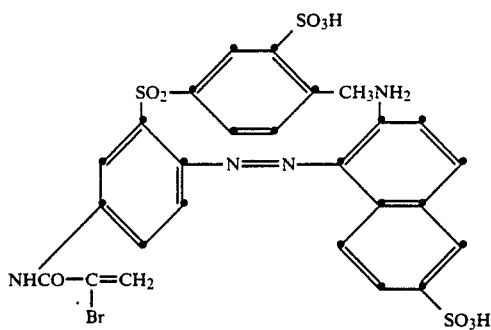

are dissolved in 100 parts of hot water, and this solution is added to the above dyebath. 100 parts of prewetted wool fabric are then introduced into said dyebath, and the temperature of the bath is raised from 50° to 80° in the course of 30 minutes. After 20 minutes of dyeing at 80° the dyebath is heated to the boil, and dyeing then proceeds at the boil for 90 minutes. Almost all the dye exhausts onto the substrate. After the bath has cooled down to 80° it is brought from about pH 4.5 to a constant pH of 8.5 by adding ammonia solution, and the dyed material is after-treated at said temperature for 20 minutes. Thorough rinsing with hot and cold water, acidifying with 1 part of 80% formic acid, centrifuging and drying produces a level dark brown wool fabric having very good wet and rub fastness and excellent light fastness.

DYEING EXAMPLE 9

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 1000 parts of water at 50°.

0.6 part of the dye obtained in Example 13 and 0.09 part of the yellow dye of the formula

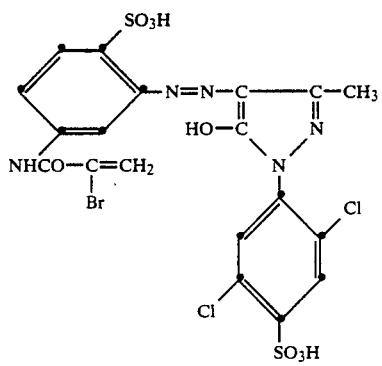

and 0.2 part of the red dye of the formula

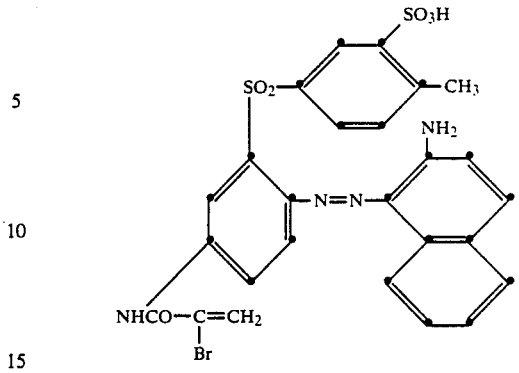

are dissolved in 100 parts of hot water, and this solution is added to the above dyebath. A circulation dyeing apparatus is charged with 100 parts of prewetted slubbing on cops, the temperature of the bath is raised from 50° to 97°-99° in the course of 30 minutes, and dyeing then proceeds at the boil for 90 minutes. Almost all the dye exhausts onto the substrate. After the bath has cooled down to 80° it is brought from about pH 4.5 to a constant pH of 8.5 by adding ammonia solution, and the dyed material is after-treated at said temperature for 20 minutes. Thorough rinsing with hot and cold water, acidifying with 1 part of 80% formic acid, centrifuging and drying produce a grey dyed material having very good wet fastness and excellent light fastness.

We claim:

1. A chromium complex of the formula

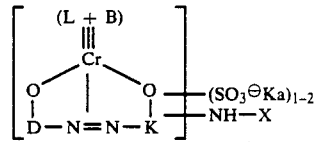

in which B is acetylacetone, benzoylacetone, ethyl acetoacetate, 2-hydroxyacetophenone, 2-hydroxybenzophenone, 1-phenyl-3-methyl-4-benzoylpyrazol-5-one, 1-phenyl-3-methyl-4-acetylpyrazol-5-one or salicylaldehyde, L is water, D is benzene which contains the oxygen atom in the o-position relative to the azo bridge and is unsubstituted or substituted by sulfo, nitro, chlorine and —NH-X or is naphthalene which contains the oxygen atom in the o-position relative to the azo bridge and is unsubstituted or substituted by sulfo, nitro and —NH-X, K is naphthalene which, in addition to —NH-X is substituted by 1 or 2 sulfo groups, the radical —NH-X being bonded to th enaphthalene nucleus either directly or via phenylamino, or is 1-phenyl-3-methylpyrazol-5-one where the group —NH-X is bonded to the phenyl ring or is 1-(2',2''-disulfortilbene)-3-methylpyrazol-5-one where the group —NH-X is bonded in the 4''-position, X is α,β-dibromopropionyl, α-bromoacryloyl or 2,6-difluoro-5-chloropyrimidinyl, and Ka is an alkali metal cation.

2. A chromium complex according to claim 1, in which B is acetylacetone.

3. A chromium complex according to claim 1 of the formula

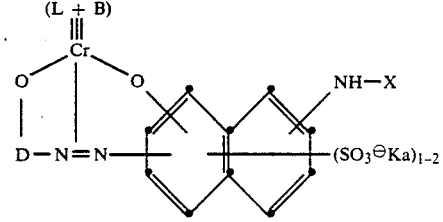

in which B, D, L and Ka are as defined in claim 1, the azo group is bonded to the naphthalene nucleus in the o-position relative to the —O— radical, X is α,β-dibromopropionyl or α-bromoacryloyl, and the chromium complex contains no more than 1 or 2 sulfo groups.

* * * * *